United States Patent [19]

Ando et al.

[11] Patent Number: 5,452,453
[45] Date of Patent: Sep. 19, 1995

[54] RULE BASED PRODUCTION SYSTEM ADAPTED FOR COMPLEX PROCEDURAL FLOW

[75] Inventors: Ichiro Ando, Kanagawa; Akio Sasaki, Tokyo; Tomoyuki Minamiyama, Kanagawa; Shoichi Maki, Kanagawa; Siryo Yasui, Kanagawa; Hiroshi Ichise, Kanagawa, all of Japan

[73] Assignees: Toyo Communication Equipment Co., Ltd., Kanagawa; Sasaki & Associates Inc., Tokyo, both of Japan

[22] Filed: Oct. 21, 1994

Related U.S. Application Data

[63] Continuation of Ser. No. 820,904, filed as PCT/JP91/00374, Mar. 20, 1991, published as WO91/18343, Nov. 28, 1991, abandoned.

[30] Foreign Application Priority Data

May 21, 1990 [JP] Japan ................................. 2-130695

[51] Int. Cl.$^6$ .............................................. G06F 15/00
[52] U.S. Cl. .............................. 395/650; 364/DIG. 1; 364/261.3; 364/274; 364/274.1; 364/274.2; 364/274.3; 364/274.5; 364/280
[58] Field of Search ....................... 395/650; 364/261.3, 364/274, 274.1, 274.2, 274.3, 274.5, 280

[56] References Cited

U.S. PATENT DOCUMENTS

| | | | |
|---|---|---|---|
| 3,651,281 | 3/1972 | Becker | 179/100.2 CH |
| 4,568,370 | 2/1986 | Powers | 65/311 |
| 4,658,370 | 4/1987 | Erman et al. | |
| 4,837,735 | 6/1989 | Allen, Jr. et al. | 364/513 |
| 5,165,011 | 11/1992 | Hisano | 395/54 |
| 5,241,652 | 8/1993 | Barabash et al. | 395/64 |

OTHER PUBLICATIONS

Ito, Hideaki and Yoneda, Junmi, "A Structure of the Production System in the Knowledge Base Building System", Japan Information Processing Developement Center, Mar. 16–18, 1988.

Ito, Hideaki and Yoneda, Junmi, "An Integration of a Database into the Knowledge-based Information Retrieval System NIRS", Japan Information Processing Development Center, Mar. 16–18, 1988.

"Application of Expert Systems", Archive No. 7, CW Publishing Co., Nov. 1, 1987.

*Primary Examiner*—Kevin A. Kriess
*Assistant Examiner*—Jonathan H. Backenstose
*Attorney, Agent, or Firm*—Spensley Horn Jubas & Lubitz

[57] ABSTRACT

In a production system in which a plurality of production rules are partitioned into a plurality of clusters for processing to effect cluster control, control expression elements, each describing an instruction for specifying a cluster to be invoked next for execution or an instruction for other flow control, are arranged in the order of execution to provide a control expression part separate from the clusters for processing. An instruction for a return to the control expression part is described in an action part of an appropriate production rule in a cluster, in place of the cluster specifying instruction, so that sequential invocation of clusters can be performed following the instructions described in the control expression part, thereby making it unnecessary to give a description for specifying the name of a cluster to be invoked next for execution in the action part of each production rule.

12 Claims, 25 Drawing Sheets

FIG. 2

```
WHEN  ..... Conditional statement
THEN  ..... Introduces an action corresponding to WHEN (this
            THEN is different from that corresponding to IF
            of the condition part of a rule).
CASE  ..... Selection
GOSUB ..... Subroutine call
RETURN .... Return from the called subroutine
GOTO  ..... Unconditional jump
@Character string ... Label
FIRE  ..... Invokes a specified clulster.
REPEAT .... Repetition
UNTIL ..... Specifies the final value for the repetition by
            the REPEAT statement
BY    ..... Specifies the step value for the repetition
            by the REPEAT statement
BREAK ..... Stops execution and displays debug information.
EXIT  ..... Return to the OS
```

FIG.3 (b)

```
       ┌ DEFINE MAIN         ··· 23
       │   FIRE Cluster_A    ··· 24
    20 │   FIRE Cluster_B    ··· 25
       │   STOP              ··· 26
       └ END
```

FIG.3 (a)

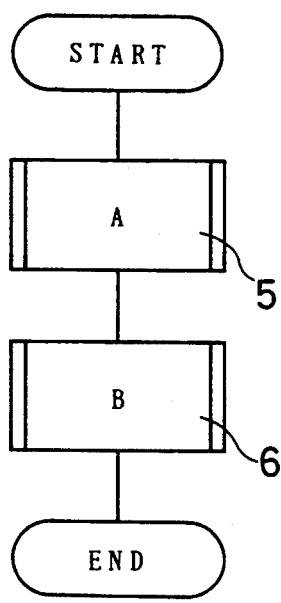

```
       ┌ DEFINE CLUSTER Cluster_A ··· 27
       │    DEFINE RULE Ar1'        ┐
       │       IF                   │
       │         Ac1                │
    28─┤       END                  │
       │       THEN                 │ Ar1'
       │         Aa1                │
    29─┤       END                  │
       │    END                     ┘
    21 │       :
       │    DEFINE RULE Arn'        ┐
       │       IF                   │
       │         Acn                │
       │       END                  │ Arn'
       │       THEN                 │
    30─┤         DONE(Aexp)         │
       │       END                  │
       │    END                     ┘
       └ END
```

```
       ┌ DEFINE CLUSTER Cluster_B
       │    DEFINE RULE Br1'        ┐
       │       IF                   │
       │         Bc1                │
       │       END                  │ Br1'
       │       THEN                 │
       │         Ba1                │
       │       END                  │
       │    END                     ┘
    22 │       :
       │    DEFINE RULE Brm'        ┐
       │       IF                   │
       │         Bcm                │
       │       END                  │ Brm'
       │       THEN                 │
       │         DONE(Bexp)         │
       │       END                  │
       │    END                     ┘
       └ END
```

FIG.4(b)

31 {
```
DEFINE MAIN
  WHEN Jc1 THEN GOTO @L1
    FIRE Cluster_C
    GOTO @L2
  @L1
    FIRE Cluster_D
  @L2
    STOP
END
```
}

32 {
```
DEFINE CLUSTER Cluster_C
  DEFINE RULE Cr1'
    IF
      Cc1
    END
    THEN
      Ca1
    END
  END
    ⋮
  DEFINE RULE Crn'
    IF
      Ccn
    END
    THEN
      DONE(Cexp)
    END
  END
END
```
}

33 {
```
DEFINE CLUSTER Cluster_D
  DEFINE RULE Dr1'
    IF
      Dc1
    END
    THEN
      Da1
    END
  END
    ⋮
  DEFINE RULE Drm'
    IF
      Dcm
    END
    THEN
      DONE(Dexp)
    END
  END
END
```
}

FIG.5 (b)

```
     ⎧ DEFINE MAIN
     ⎪   @START
     ⎪     WHEN Jc1 THEN GOTO @L1
     ⎪     FIRE Cluster_E
  34 ⎨     GOTO @START
     ⎪   @L1
     ⎪     STOP
     ⎩ END ⎧ DEFINE CLUSTER Cluster_E
     ⎪   DEFINE RULE Er1'
     ⎪     IF
     ⎪        Ec1
     ⎪     END
     ⎪     THEN
     ⎪        Ea1
     ⎪     END
     ⎪   END
  35 ⎨          ⋮
     ⎪   DEFINE RULE Ern'
     ⎪     IF
     ⎪        Ecn
     ⎪     END
     ⎪     THEN
     ⎪        DONE(Eexp)
     ⎪     END
     ⎪   END
     ⎩ END
```

```
                          DEFINE RULE Ar1
                              IF
                                  &Control ^now=Cluster_A
                                      Ac1
                                  END
                              THEN
                                  Aa1
                              END
                          END
                          DEFINE RULE Arn
                              IF
                                  &Control ^now=Cluster_A
                                      Acn
                                  END
                              THEN
                                  MODIFY 1 ^now main
                              END
                          END
                      } Cluster A DEFINE RULE Br1
                              IF
                                  &Control ^now=Cluster_B
                                      Bc1
                                  END
                              THEN
                                  Ba1
                              END
                          END
                          DEFINE RULE Brm
                              IF
                                  &Control ^now=Cluster_B
                                      Bcm
                                  END
                              THEN
                                  MODIFY 1 ^now main
                              END
                          END
                      } Cluster B DEFINE RULE LINE 10
        IF
            &Control      ^now=main
            &Line_number  ^No =10
        END
        THEN
            MODIFY 1 ^now Cluster_A
            MODIFY 2 ^No 20
        END
    END
    DEFINE RULE LINE 20
        IF
            &Control      ^now=main
            &Line_number  ^No =20
        END
        THEN
            MODIFY 1 ^now Cluster_B
            MODIFY 2 ^No 30
        END
    END
    DEFINE RULE LINE 30
        IF
            &Control      ^now=main
            &Line_number  ^No =30
        END
        THEN
            STOP
        END
    END
} Control
  Expression
  Part
```

FIG. 10

```
DEFINE RULE LINE 10 WHEN
    IF
        &Control     ^now=main
        &Line_number ^No  =40
        Jcl matched
    END
    THEN
        MODIFY 2 ^No 50
    END
END
DEFINE RULE LINE 10 ELSE
    IF
        &Control     ^now=main
        &Line_number ^No  =40
        Jcl not matched
    END
    THEN
        MODIFY 2 ^No 20
    END
END
DEFINE RULE LINE 20
    IF
        &Control     ^now=main
        &Line_number ^No  =20
    END
    THEN
        MODIFY 1 ^now Cluster_C
        MODIFY 2 ^No  30
    END
END
```

Control
Expression
Part

```
DEFINE RULE LINE 30
    IF
        &Control     ^now=main
        &Line_number ^No  =30
    END
    THEN
        MODIFY 2 ^No 70
    END
END
DEFINE RULE LINE 50
    IF
        &Control     ^now=main
        &Line_number ^No  =50
    END
    THEN
        MODIFY 1 ^now Cluster_D
        MODIFY 2 ^No 70
    END
END
DEFINE RULE LINE 70
    IF
        &Control     ^now=main
        &Line_number ^No  =70
    END
    THEN
        STOP
    END
END
```

Control
Expression
Part

Cluster C:
```
DEFINE RULE Cr1
  IF
    &Control ^now=Cluster_C
    Cc1
  END
  THEN
    Ca1
  END
END
      :
DEFINE RULE Crn
  IF
    &Control ^now=Cluster_C
    Ccn
  END
  THEN
    MODIFY 1 ^now main
  END
END
```

Cluster D:
```
DEFINE RULE Dr1
  IF
    &Control ^now=Cluster_D
    Dc1
  END
  THEN
    Da1
  END
END
      :
DEFINE RULE Drm
  IF
    &Control ^now=Cluster_D
    Dcm
  END
  THEN
    MODIFY 1 ^now main
  END
END
```

```
DEFINE RULE LINE 60
    IF  &Control  `now=main
        &Line_number  `No =60
    END
    THEN
        STOP
    END
END
```
```
DEFINE RULE Er1
    IF  &Control  `now=Cluster_E
        Ec1
    END
    THEN
        Ea1
    END
END
```
```
DEFINE RULE Ern
    IF  &Control  `now=Cluster_E
        Ecn
    END
    THEN
        MODIFY 1  `now main
    END
END
```

} Control Expression Part

} Cluster E

```
DEFINE RULE LINE 20 WHEN
    IF  &Control  `now=main
        &Line_number  `No =20
        Jcl matched
    END
    THEN
        MODIFY 2  `No 60
    END
END
DEFINE RULE LINE 20 ELSE
    IF  &Control  `now=main
        &Line_number  `No =20
        Jcl not matched
    END
    THEN
        MODIFY 2  `No 30
    END
END
DEFINE RULE LINE 30
    IF  &Control  `now=main
        &Line_number  `No =30
    END
    THEN
        MODIFY 1  `now Cluster_E
        MODIFY 2  `No 40
    END
END
DEFINE RULE LINE 40
    IF  &Control  `now=main
        &Line_number  `No =40
    END
    THEN
        MODIFY 2  `No 20
    END
END
```

} Control Expression Part

```
DEFINE RULE LINE   α   GOSUB
   IF
      &Control        ^now=main
      &Line_number    ^No  = α
      &Depth          ^sp IS β
   END
   THEN
      LET  β  =  β +1
      MAKE Call_stack ^Ret γ ^depth β
      MODIFY 2 ^No   δ
      MODIFY 3 ^sp    β
   END
END
```

FIG.13 (b)

```
DEFINE RULE LINE   ε   RET
   IF
      &Control        ^now=main
      &Line_number    ^No  = ε
      &Depth          ^sp IS β
      &Call_stack     ^Ret IS γ ^depth= β
   END
   THEN
      LET  β  =  β -1
      MODIFY 2 ^No  γ
      MODIFY 3 ^sp    β
      REMOVE 4
   END
END
```

FIG. 17 (b)

```
         ┌ DEFINE RULE Ar1                          ┐
         │    IF                            ┐       │
     7 ──┤      &Control ˆnow=Cluster_A     │       │
         │      Ac1                         │       │
         │    END                           │       │
     8 ──┤    THEN                          │  Ar1  │
         │      Aa1                         │       │
         │    END                           ┘       │
Cluster A┤ END                                      │
         │    :                                     │
         │ DEFINE RULE Arn                          │
         │    IF                                    │
         │      &Control ˆnow=Cluster_A             │
         │      Acn                                 │
         │    END                                   │  Arn
         │    THEN                                  │
     9 ──┤      MODIFY 1 ˆnow Cluster_B             │
         │    END                                   │
         └ END                                      ┘

┌ DEFINE RULE Br1                          ┐
         │    IF                                    │
         │      &Control ˆnow=Cluster_B             │
         │      Bc1                                 │
         │    END                                   │  Br1
         │    THEN                                  │
         │      Ba1                                 │
         │    END                                   │
Cluster B┤ END                                      │
         │    :                                     │
         │ DEFINE RULE Brm                          │
         │    IF                                    │
         │      &Control ˆnow=Cluster_B             │
         │      Bcm                                 │
         │    END                                   │  Brm
         │    THEN                                  │
    10 ──┤      STOP                                │
         │    END                                   │
         └ END                                      ┘
```

Cluster J (Decision on Jcl):

```
     ⎧ DEFINE RULE Jr1
     ⎪   IF
     ⎪     &Control ˆnow=Cluster_J
Jr1 ⎨     Jcl matched
     ⎪   END
     ⎪   THEN
     ⎪     MODIFY 1 ˆnow Cluster_D
     ⎪   END
     ⎩ END
     ⎧ DEFINE RULE Jr2
     ⎪   IF
     ⎪     &Control ˆnow=Cluster_J
Jr2 ⎨     Jcl not matched
     ⎪   END
     ⎪   THEN
     ⎪     MODIFY 1 ˆnow Cluster_C
     ⎪   END
     ⎩ END
```

Cluster C:

```
⎧ DEFINE RULE Cr1
⎪   IF
⎪     &Control ˆnow=Cluster_C
⎪     Cc1
⎪   END
⎪   THEN
⎪     Ca1
⎪   END
⎨ END
⎪        ⋮
⎪ DEFINE RULE Crn
⎪   IF
⎪     &Control ˆnow=Cluster_C
⎪     Ccn
⎪   END
⎪   THEN
⎪     STOP
⎪   END
⎩ END
```

Cluster D:

```
⎧ DEFINE RULE Dr1
⎪   IF
⎪     &Control ˆnow=Cluster_D
⎪     Dc1
⎪   END
⎪   THEN
⎪     Da1
⎪   END
⎨ END
⎪        ⋮
⎪ DEFINE RULE Drm
⎪   IF
⎪     &Control ˆnow=Cluster_D
⎪     Dcm
⎪   END
⎪   THEN
⎪     STOP
⎪   END
⎩ END
```

```
                    ┌  DEFINE RULE Jr1
                    │    IF
                    │      &Control ~now=Cluster_J
                    │      Jc1 matched
                    │    END
                    │    THEN
                    │      STOP
                    │    END
Cluster J           │  END
(Decision on Jc1)   ┤  DEFINE RULE Jr2
                    │    IF
                    │      &Control ~now=Cluster_J
                    │      Jc1 not matched
                    │    END
                    │    THEN
                    │        MODIFY 1 ~now Cluster_E
                    │    END
                    └  END ┌  DEFINE RULE Er1
                    │    IF
                    │      &Control ~now=Cluster_E
                    │      Ec1
                    │    END
                    │    THEN
                    │      Ea1
                    │    END
                    │  END
Cluster E           ┤           :
                    │  DEFINE RULE Ern
                    │    IF
                    │      &Control ~now=Cluster_E
                    │      Ecn
                    │    END
                    │    THEN
                    │        MODIFY 1 ~Cluster_J
                    │    END
                    └  END
```

RULE BASED PRODUCTION SYSTEM ADAPTED FOR COMPLEX PROCEDURAL FLOW

This is a file-wrapper continuation of application Ser. No. 07/820,904, filed as PCT/JP91/00374, Mar. 20, 1991, published as WO91/18343, Nov. 28, 1991, now abandoned.

BACKGROUND OF THE INVENTION

1. Field of the Invention

A production system for an expert system and, more particularly, a method for integrating flow descriptions in a procedural language and production rules is described which simplifies programming. A method for converting such a program into a form executable in conventional production systems is also disclosed.

2. Description of the Prior Art

A representation of conditional knowledge expressed by a form "IF A THEN B" is called a production rule (hereinafter referred to simply as a rule), where A is called a "condition" and B an "action". The condition and the action are related to each other for solving a problem in a given application domain based on an expert's knowledge. A production system, as shown conceptually in FIG. 15, makes inferences based upon a set of rules and performs knowledge processing.

In FIG. 15 the reference numeral 1 indicates a production memory for storing a plurality of rules and numeral 2 indicates a working memory for storing a plurality of working memory elements each composed of a class name and a plurality of attribute values. An inference unit 3 matches the condition parts of all the rules with all of the working memory elements, instantiates and groups those of the rules whose conditions are all satisfied into a conflict set 4, selects one of the rules based on a certain strategy and executes an operation described in the action part of the rule thus selected. Such execution of the action part of a rule is called firing of the rule and firing usually causes a change in the contents of the working memory. The conflict set is produced and the inference processing is repeatedly performed regardless of whether or not the contents of the working memory undergo a change.

FIG. 16 is a flowchart of the above-mentioned operation. In Step 1: a Matching step (ST1), the data (working memory elements) are compared with the condition of each of the rules. Next, in Step 2: a Resolution of conflict step (ST2), a particular rule to be executed is selected. Next, in Step 3: an Execution step (ST3), the selected rule is executed and the data of the working memory is accordingly updated.

Typical production systems obtain desired results by repeatedly performing the above-mentioned steps 1 through 3, while at the same time updating the working memory elements. When no rule is satisfied (i.e. not all of the conditions after "IF" are true) or the action (the part after "THEN") which contains a description stopping the process, however, the production system typically terminates the process regardless of the result.

The condition part of a rule often contains a combination of plural conditions, hereinafter each referred to as a condition element. In creating such a condition, a programmer needs only to list the desired condition elements. In the action part, he only needs to write actions to be executed corresponding to the condition elements in the condition part in the order of their execution. In this context, it is not necessary to write anywhere how to produce the conflict set, that is, how to match the condition parts of the rules with the working memory elements. The reason for this is that the execution sequence of the rules is automatically determined based on an expert knowledge contained in each of the rules, and the selection of one of the rules out of the conflict set is based on a predetermined strategy. For example, the rule having the largest number of condition elements is selected first. Hence, the rules need not be arranged in any predetermined sequence but may be arbitrarily sequenced.

The above is an advantage in the rule base description, allowing much ease in the description of a process for which an ordinary procedural language would incur complex and troublesome programming. However, the idea of the basic production system described above has such drawbacks as follows.

That the rules may be arranged in any sequence means that they are all equal in the possibility of being selected. In practice, however, the situation frequently arises where it is necessary to ignore a particular group of rules or select a rule from a particular group of rules. That is, it is often needed that during execution of a process only rules related thereto be honored as candidates for selection, but in the case of the rule base, it is very difficult for a programmer to select such a particular group of rules arbitrarily and explicitly. In other words, much difficulty is encountered in controlling the selection of rules in a rule base, and it is difficult to collect only those rules for sequentially executing particular processes, for instance, inputting, counting and printing processes (hereinafter referred to as subtasks) and handle them as a module for selection. It is therefore necessary to use a special programming technique in performing a process including a branch or loop with respect to a plurality of subtasks as in the case of the conventional procedural language, and a method called "cluster control", for example, has been employed in the past.

The cluster control is a rule base programming technique in which rules necessary for executing each of several subtasks are defined as a cluster and the name of the cluster to which the rule belongs is described in its condition part. More specifically, a control working memory element is prepared for specifying which cluster is to be executed, and its class name, attribute name and attribute value are defined as, for example, Control, now and Cluster A, respectively. Only those of the rules which have a condition element "& Control now=-Cluster A" in their condition part are intended as the candidates for instantiation. This condition element means, "If there exists a working memory element which has the class name 'Control' and a value 'Cluster A' of the attribute now." Incidentally, only one control working memory element is employed for cluster control, and upon completion of processing in a certain cluster, the attribute value of the control working memory element is updated or changed to the cluster name to be invoked next. Thus, different clusters are selected one after another.

A description will now be given of an example of processing which is performed through utilization of such cluster control.

FIG. 17(a) is a flowchart for executing subtasks A and B in this order and FIG. 17(b) shows rules corresponding thereto. In FIG. 17, reference numerals 5 and 6 indicate the subtasks A and B, and rule names Ar1 to Arn denote rules belonging to a cluster A and Br1 to Brm rules belonging to a cluster B. The rule Ar1 begins with "DEFINE RULE Ar1", identifying the rule name followed by descriptions of a condition part 7 and an action part 8, ending with an "END". The condition part 7 starts with "IF" indicating the beginning of the condition part followed by the condition element "& Control now=Cluster A" indicative of the existence of the working memory element which has the class name "Control", the attribute name " ^ now" and the attribute value "Cluster A", then followed by another condition element "Acl" denoting a plurality of condition elements in general form, and the condition part 7 ends with an "END". The action part 8 starts with "THEN", followed by a group of actions Ar1 denoting a plurality of actions in general form, terminating with "END". Other rules are also described in the same fashion as mentioned above.

In this example, the letter "A" in "Ar1" indicates the cluster A and "r" stands for a rule, and "c" in "Ac1" and "a" in "Aa1" stand for a condition and an action, respectively. The same applies to other rules.

For a condition element indicating the absence of the working memory element, "?" is used in place of "&" as referred to later on.

For executing a process through use of the rules shown in FIG. 17, a control working memory element is prepared as depicted in FIG. 17(c). Assuming its class name and attribute name are, for instance, "Control" and " ^ now", respectively, if the value of the attribute " ^ now" is the Cluster A, then only rules which have the condition element "& Control ^ now=Cluster A" in their condition part will be the candidates for instantiation, and rules without such a condition element will not be attribute " ^ now" is the Cluster B, rules which have a condition element "& control ^ now=Cluster B" become the candidates for instantiation, whereas rules without such a condition element will not be instantiated.

In the above example, the condition element "& Control ^ now=Cluster A" is described in the condition part of each of the rules concerning the subtask A, and the condition element "& Control ^ now=Cluster B" is described in the condition part of each of the rules concerning the subtask B. Moreover, in the action part of the rule Arn which is fired at the end of the execution of the subtask A, an action 9 "MODIFY 1 ^ now Cluster B" changes the value of the attribute " ^ now" of the control working memory element to "Cluster B", whereas an action 10 "STOP" described in the action part of the rule Brm is fired at the end of the execution of the subtask B. The numeral immediately following "MODIFY", "1" in this example, indicates the line number of the condition element with which the working memory element updated should match. This method permits omission of the class name of the working memory element whose attribute value is to be updated.

With the programming technique described above with respect to FIG. 17(b), when the initial condition is "& Control ^ now=Cluster A", the attribute value of the control working memory element is updated to Cluster B upon completion of the execution of the cluster A and then the cluster B is executed. Even if the number of clusters is three or more, they can similarly be executed in a sequential order.

FIG. 18(a) is a flowchart including a branch and FIG. 18(b) rules corresponding thereto. In FIG. 18 reference numeral 11 indicates a process of conditional branch, which is a procedure for selectively executing either one of clusters C12 and D13, depending on whether or not both the condition "& Control ^ now=- Cluster J" and a condition Jc1 described in the condition part of each rule of the cluster J are satisfied. Rule names Jr1 and Jr2 denote rules which form the cluster J, and these rules both have the condition "& Control now=Cluster J" in their condition part, but the rule Jr1 has the condition that a condition Jc1 holds as well, whereas the rule Jr2 has the condition that Jc1 does not hold as well.

The execution of the above-mentioned process starts if the initial condition "& Control now=Cluster J" holds, and either the rule Jr1 or Jr2 is fired depending on whether or not a working memory element satisfying the condition Jc1 is present in the working memory.

As a result of this, the process is branched to the cluster C or D for execution, by updating the value of the control working memory element in accordance with the action described in the action part of the rule fired as mentioned above. Rules corresponding to the cluster C12 and D13 and the way they are executed are similar to the example shown in the FIG. 17, and hence no description will be repeated here.

FIG. 19(a) is a flowchart of a process including a loop and FIG. 19(b) shows rules corresponding thereto. In FIG. 19 reference numeral 14 indicates a process of conditional branch for selecting the execution of a cluster E15 or termination of the process depending on whether or not a condition "& Control ^ now=Cluster J" and a condition Jc1 described in the condition part of each rule of the cluster J are satisfied in the production system. Rule names Jr1 and Jr2 denote rules in the cluster J. These rules are similar to those in the case of FIG. 18, and hence no further description will be given of them. A rule Ern is to be fired at the end of the execution of the cluster E. Upon completion of this step, the value of the attribute ^ now of the cluster control working memory element is updated for the cluster J, and then the process returns to the decision step 14.

This step begins with firing the rule Jr1 or Jr2, depending on whether or not a working memory element satisfying the condition Jc1 is present in the working memory, assuming the initial condition "& control ^ now=Cluster J" holds.

As a result of this, in accordance with the action described in the action part of the rule fired as mentioned above, either cluster E is executed by updating the value of the control working memory element, or the process is finished without updating. After execution of the cluster E, the value of the working memory element is updated by "MODIFY 1 ^ now Cluster J". Thus, the decision of the branching condition is repeated, since the looping process is repeated until the branch condition is satisfied.

It is mandatory, however, that the above-described three examples call for a cluster control working memory element which have the class name "Control" and the attribute " ^ now". It is also necessary to include in the condition part of each rule a condition element for cluster control such as "& Control ^ now=Cluster A", in addition to the condition Ac1. Moreover, for executing the cluster B after the cluster A, it is also necessary to describe in the rule to be executed at the end a control action for modifying the value of the attribute " ^ now", such as "MODIFY 1 ^ now Cluster B."

While in the example in FIG. 18 the attribute " ^ now" of the cluster control condition has been assumed to take only three values ("Cluster J", "Cluster C" and "Cluster D") for the sake of brevity, a large number of clusters are needed for an actual production system to perform required processes. It is almost impossible in practice to predetermine the order of execution of all clusters used, classify the clusters for each branch or loop, and append a cluster control condition and an action to each rule. In other words, the production system in principle is capable of performing procedural processes through utilization of cluster control, but since there is a limit to man's programming ability, only production systems composed of hundreds to thousands of rules at most have been the largest ever implemented regardless of the scale and capabilities of the computer used. In sum, it has been very difficult to implement large scale production systems which call for complicated sequence control.

SUMMARY OF THE INVENTION

It is therefore an object of the present invention to provide a programming technique which enables cluster-wise flow control of a production system involving complicated sequence control to be easily described like in a procedural language, and hence permits the construction of a large scale production system. The invention also provides a program conversion method therefor.

To attain the above objective, the production system of the present invention comprises a control expression part separate from the processing clusters. The control expression part comprises plural control expression elements, each control expression element describing an instruction for specifying processing a cluster to be invoked next for execution, or an instruction for other flow control. The clusters include instructions for return to the control expression part. These instructions are located in the action part of an appropriate production rule in a cluster, in place of the cluster specifying instruction. Thus, sequential invocation of clusters is performed according to the instructions in the control expression part.

In a preferred embodiment, each control expression element in the control expression part is converted to one or more production rules to thereby convert the control expression part to a control cluster composed of one or more production rules. The instructions in the action part of an appropriate rule of the cluster for return from the processing cluster to the control expression part are converted to appropriate actions. Such a conversion method results in a rule based production system in which relatively easily created rules of the control expression part and logically separate clusters of production rules for processing automatically are combined for use in typical expert systems requiring integrated operations.

A production system according to the invention may be stored on a magnetic, optical, or electrical storage medium, or magnetic-optical-electrical compound medium for use in a general purpose computer system.

BRIEF DESCRIPTION OF THE DRAWINGS

FIG. 2 is a table showing examples of control expression elements for use in accordance with the present invention;

FIGS. 3(a) and 3(b) show an example of executing clusters A and B in this order;

FIGS. 4(a) and 4(b) show an example of the execution of clusters which include a branch;

FIGS. 10 through 14 show converted rules;

FIGS. 17 through 19(a) show prior art examples.

DETAILED DESCRIPTION OF THE INVENTION

Figure 1:
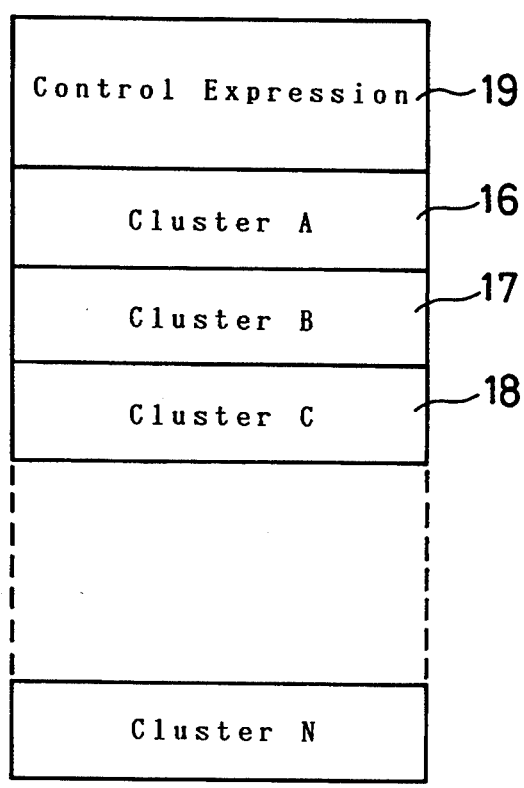
FIG. 1 is a diagram showing the outline of a program for use in accordance with the present invention.

FIG. 1 shows the outline of a program for use in accordance with the present invention. Reference numerals 16, 17 and 18 indicate clusters each composed of a plurality of rules written for a given subtask. The clusters are denoted by A, B, . . . and N, respectively, and the rules belonging to each cluster are described in the conventional rule base. Reference numeral 19 indicates a control expression added according to the present invention, for defining the order of execution of the clusters. The control expression makes unnecessary the control condition and the control action described for cluster control for sequential processing, branching, looping, etc., as mentioned previously in connection with the prior art.

FIG. 2 exemplifies some control expression elements for describing the control expression in a form similar to the BASIC language, a conventional procedural language, or the like. The control expression elements are instructions for executing different processes. By providing appropriate control expression elements it is possible to execute almost all types of procedural processes.

A method for describing the control expression will be described in detail below. According to the present invention, any desired cluster control can be effected by describing the control expression with one or more of such control expression elements which are selected therefrom as required for the processes to be executed.

Next, a description will be given of how the process mentioned previously with respect to the prior art is described in a program of the present invention employing the above-mentioned control expression.

FIG. 3(a) is a flowchart for executing the clusters A and B in this order and FIG. 3(b) a program prepared according to the present invention for executing the flow. The program comprises a control expression part 20, a cluster A21 and a cluster B22, which correspond to the control expression 19, the cluster 16 and the cluster 17 shown in FIG. 1.

The control expression part 20 consists of a declare statement 23 "DEFINE MAIN" indicating the beginning of the control expression part, steps 24 through 26 describing a plurality of control expression elements in a sequential order, and a declaration "END" indicating the end of the control expression part. The steps 24 and 25 are instructions for invoking and executing clusters specified by name in the steps, and the control expression part 20 specifies the order of execution of a plurality of clusters. Incidentally, "FIRE" in this embodiment is one of the control expression elements exemplified in FIG. 2 and is a descriptor for selecting a required cluster by name and invoking it, i.e. an instruction for specifying, as candidates for firing, only rules belonging to the required cluster, and excluding all the rules belonging to other clusters.

The cluster A consists of a declare statement 27 "DEFINE CLUSTER cluster A" indicating the beginning of the cluster A, rules Ar1' through Arn' and a declaration "END" indicating the end of the cluster. Each rule has a condition part 28 and an action part 29 as is the case with the conventional rule. Further, added to the rule Arn' which is fired at the end to complete processings of the cluster A is a descriptor 30 "DONE(Aexp)". The descriptor "DONE(Aexp)" is one that, after completion of the processings of the cluster A, commands that control be transferred to a step next to the step 24 in the control expression part that selected the cluster A and, at the same time, commands that the value of information of a name "Aexp" obtained by the processing of the cluster A is stored in a preassigned memory. The cluster B also consists of a declare statement, rules Br1' through Brm' and a declaration "END" as is the case with the cluster A.

Next, a description will be given of the operation of this embodiment, which executes the clusters A and B in this order. The execution procedure therefor is similar to the relationship between a main routine and a subroutine in a procedural language. That is, the cluster A is driven based on the first step of the control expression part 20 and the value of information Aexp obtained by the execution of the cluster A is stored in a preassigned memory in accordance with the descriptor "DONE(Aexp)" described in the action part of the rule which is selected at the end of the execution of the cluster A, after which control returns to the second step in the control expression part 20. Next, the cluster B is driven based on the second step and the value of information Bexp obtained by the execution of the cluster B is stored in a preassigned memory in accordance with a "SONE (Bexp)" described in the rule which is selected at the end of the execution of the cluster B, after which control returns to the third step in the control expression part as in the above. The third step is a description "STOP" and the process terminates accordingly. In this way, a plurality of clusters can be driven one after another following descriptions of flow control in conventional procedural form.

In general, after completion of processing of a certain cluster, another cluster is driven in accordance with information obtained from the processing of the preceding cluster, and based on the descriptor DONE (parameter name) in the rule executed at the end of the processing of that cluster the control returns to the next step in the control expression part. Or alternatively, depending upon the content described in the step of the control expression part, the step to be executed next is selected instead of a cluster for the next invocation. By continuing a series of such procedures the flow control at the cluster level proceeds.

The afore-mentioned traditional cluster control technique permits only transfer of control between clusters. This embodiment passes information obtained by processing of each cluster to the control expression part as well as transfers control between each cluster and the control expression part. The present invention achieves this control through very simple programming, while the conventional cluster control techniques involve very complex programming.

Figure 4A:
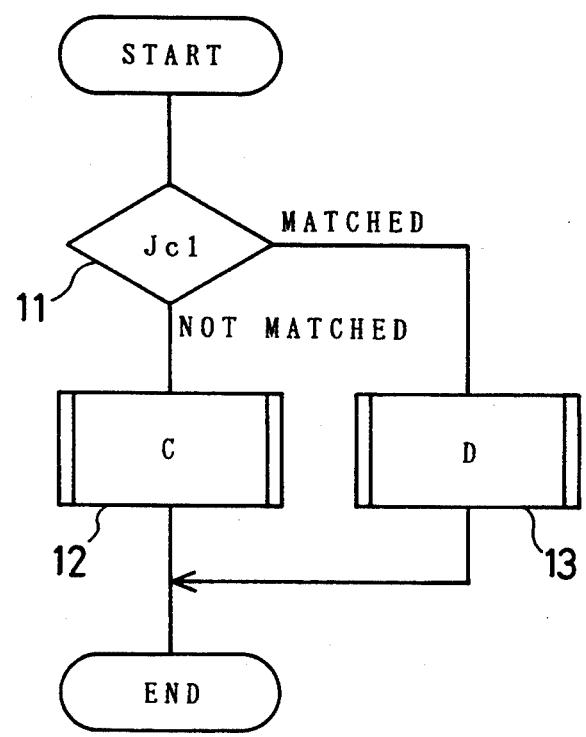

FIG. 4(a) is a flowchart including a branch and FIG. 4(b) shows a program prepared therefor according to the present invention. The program consists of a control expression part 31, a cluster C32 and a cluster D33.

The control expression part 31 includes a declare statement, a plurality of steps and a declaration "END" as is the case with the above-described embodiment, and the control expression part 31 is to perform branch processing as a whole.

The description "WHEN" Jc1 THEN GOTO @L1" given in the first step is an instruction for jumping to a step labeled @L1 when a condition "Jc1" is satisfied as will be described in detail later on. Here, "WHEN" corresponds to "IF" in the BASIC, FORTAN and similar languages.

The "GOTO" in the third step is an instruction for unconditional jump to a step labeled @L2.

Steps headed with a "@" such as @L1, the fourth, and @L2, the sixth step will hereinafter be referred to as label lines. They are not instructions for performing something in particular but are denotations which are referred to when jumping to a desired step in the control expression part 31. The use of such labels allows ease in jumping to required steps in those cases where the number of loops or branches executed is large.

The clusters C32 and D33 each consist of a declare statement, rules and a declaration "END" as in the above example.

This embodiment is to execute a flow including a branch. The operation therefor will herein below be described.

In the first step it is determined whether or not the condition "Jc1" is met, and if it is met, then the process will jump to the fourth step labeled @L1. Since the fourth step is a mere label line, control is passed to the fifth step, in which the cluster D is invoked. Upon completion of the execution of the cluster D, control is transferred via the sixth step labeled @L2 to the seventh step "STOP", at which the process is terminated.

If the condition "Jc1" is not met in the first step, control is passed to the second step, whereat the cluster C is invoked. Upon completion of execution of cluster C, control is transferred via the sixth step labeled @L2 to the seventh step "STOP", at which the process is terminated.

With such conditional processing as mentioned above, the process can be branched to either one of the two clusters, and a conditional branch to three or more clusters can be processed in a similar way.

FIG. 5(a) is a flowchart including a loop and FIG. 5(b) shows a program prepared therefor according to the present invention. The program consists of a control expression part 34 and a cluster E35 as in the above.

The control expression part 34 includes a declare statement, descriptions of a plurality of steps and a declaration "END", and this control expression part is to perform looping as a whole.

The "@START" in the first step is a label and the other steps are described in the same manner as in the above.

This embodiment is to perform looping as follows: In the first step labeled @START nothing is done and control is passed to the second step, at which is determined whether or not a condition "Jc1" is met. If the condition is met, the process jumps to the fifth step labeled @L1 and then to the sixth step "STOP", in which the process is terminated.

Where the condition "Jc1" is not met in the second step, control is passed to the third step "FIRE cluster E" to invoke the cluster E. This is followed by an execution of the fourth step "GOTO @START", resulting in transfer of control to the second step, via the label @START on the first step at which it is determined again whether or not the above-mentioned condition is met.

As described above, in this embodiment it is determined whether a certain condition is met or not and the result of this test is used to branch the process to the step for invoking the cluster E or the step for terminating the process. This embodiment thus makes a looping process which is an important case of conditional branch possible.

Now, comparison will be made between the description of rules according to the present invention and the description in the prior art. In the case of enabling the clusters A and B in this order, the program prepared according to the present invention, shown in FIG. 3, does not include the description of the control condition "& control ^ now=Cluster A" in the rules nor does it call for the description of the control action "MODIFY 1 ^ now Cluster B." Also in the case where a branch or loop is included, it is unnecessary to describe the control condition and the control action in the rules, and the processes corresponding to them are all described in procedural form in the control expression part.

That is to say, the production system according to the present invention operates on a program which consists of such a combination of the control expression part and the clusters as mentioned above. The most important point of programming is to describe the control sequence in the control expression part in the same fashion as in the case of using conventional procedural languages, group the rules into appropriate named clusters and describe merely "DONE (parameter)" in the action part of the rule in each cluster from which the process is to return to the control expression part. Thus, the present invention allows much more ease in describing the control expression part for cluster control than in the prior art. Hence, a large scale production system, which could not have been realized due to the complexity involved in describing the control condition and the control action, can easily be implemented through use of the above programming method.

As described above, the present invention permits control of the execution sequence of a plurality of clusters through very simple programming. In other words, in the present invention a programmer describes in the control expression part a branch by GOTO and a loop by REPEAT/UNTIL in the same manner as in the case of the conventional procedural languages and passes control to a desired step to thereby make the description of the control action in the rule unnecessary. Accordingly, procedural cluster-wise flow control can be described very simply by a proper combination of these control expression elements.

With the production system of the present invention, the programmer needs only to describe the control expression part and the rules separately of each other as mentioned above and need not consider the description of the control condition in each rule.

The programs as they stand consisting of a combination of the control expression part and the rules described as mentioned above cannot be used with conventional production systems for the following reasons: Since the conventional production systems lack the concept of control expression, its description is meaningless. Since the descriptions of the condition and action for the cluster control are removed from the rules because of the use of the control expression, it is impossible, with such a program, to effect cluster control in the prior art production systems. In the following, a description will be given of a method for converting the program to a form applicable to the production systems employing the conventional rule base in order to guarantee compatibility. The basic concept of this method is to convert each step of the control expression part to one or more rules, insert a control condition and a control action into each rule in each cluster in the same manner as in the prior art, and convert the descriptor "DONE (parameter)" to the corresponding operations.

Figure 6:
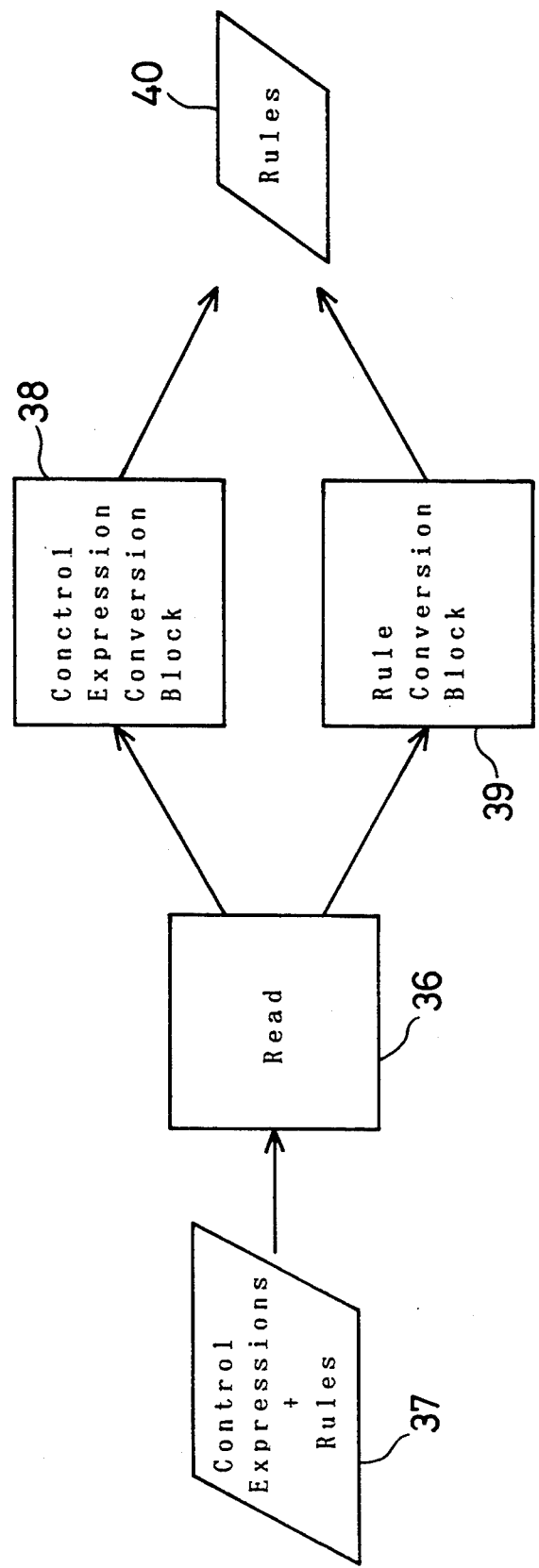
FIG. 6 is a conceptual diagram showing a rule conversion method.

FIG. 6 is a conceptual diagram illustrating in a block form the method and apparatus by which the program consisting of the control expression part and rules, prepared according to the present invention, is converted to a rule base which is an integration of the two and can be executed by conventional production systems.

In FIG. 6, reference numeral 36 indicates a read station, which reads a program 37 described as a combination of the control expression part and rules and separates the program 37 into the control expression part and the rules by referring to the declare statement at the head of each part indicating whether it is the control expression part or a cluster and the declaration "END".

The control expression part is a description consisting of a combined set of steps selected from amongst the control expression elements together with variables included therein. The steps are each converted to one or more rules of a conventional format applicable to the prior art production system. That is, a control expression conversion block 38 reads respective steps of the control expression part separated by the read station 36 and converts them to rules of the conventional format which are capable of the functions corresponding to instructions as depicted in the right-hand column of FIG. 2. The rules separated by the read station 36 are also converted by a rule conversion block 39 to rules described in the conventional format.

Thus, the program 37 is converted to a group of rules 40 of the format executable in the conventional production system and the control expression part becomes a control cluster. With respect to the conversions described herein, care should be taken as shown later on in handling the variables described in the control expression part and the rules, different steps or rules incurring different processings.

The above is the basic concept of conversion, which can be implemented by use of methods described below.

Figure 7:
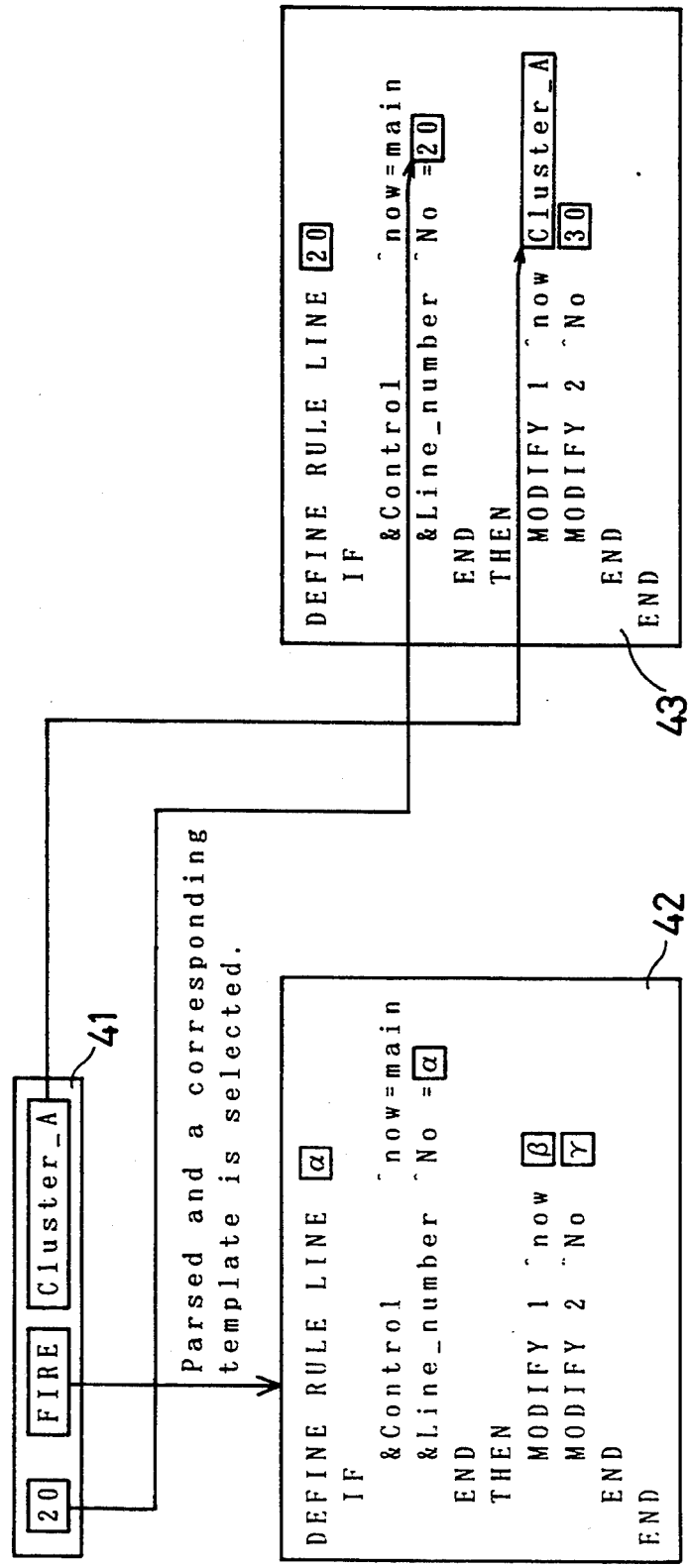
FIGS. 7 and 8 show examples of converting a control expression to a rule.

FIG. 7 is a diagram illustrating an example of a method for converting the control expression part to rules of a format which can be enabled in the conventional production system. The method will be described as being applied to the conversion of the step "FIRE cluster A."

Reference numeral 41 indicates a step of the control expression part, headed by a logical line number representing the location where it is in the control expression part. The logical line number, though not actually used, is an expedient means for conversion and every tenth number, for example, is used as the logical line number after the manner of the line number in BASIC. Reference numeral 42 denotes a template which is prepared corresponding to the said step of the control expression in which the processings to be executed in the step are described in the traditional rule format but variable parts (fields of α, β and γ in this example) are held blank. Appropriate parts of a character string forming the step 41 are extracted out thereof and inlaid in the variable parts of the template 42 to form a rule 43.

As a basis of the whole system concept use of two control working memory elements are assumed one of which has a class name "Control" and an attribute " ^ now" and the other of which has a class name "Line-number" and an attribute " ^ No". As shown in FIG. 7, the template 42 corresponding to "FIRE" consists of: a declaration indicating that the rule name is "LINE_α"; "IF" representing the condition part; "& Control ^ now=main" for controlling a cluster; "Line number ^ No=α" indicating the logical line number of the step; a declaration "END"; "THEN" indicating the action part; an instruction for updating the control working memory element, "MODIFY 1 ^ now β; and instruction for writing the logical line number of the control expression part to be executed next into the attribute " ^ NO" of the working memory element of the class Line__number, "MODIFY 2 ^ NO γ; a declaration "END"; and a declaration "END" indicating the end of the rule; all these being listed in this order. Templates corresponding to all types of the steps of the control expression are stored in a memory associated with the control expression converting block 38 in FIG. 6, and the template described here above is an example.

The two conditions "& Control ^ now=main" and "& Line-number ^ no=α" are always inserted even in other cases then "FIRE."

By the conversion described above, the logical line number "20" of the step and "cluster A" which is the name of the cluster to be invoked are extracted out of the control expression and inlaid in the fields "α" and "β" in the template 42, and further, the logical line number "30" of the control expression part to which the process is to return is inlaid in the field "γ", obtaining the rule 43 of the conventional format as shown.

In this way, steps of the control expression part are converted to rules of the format acceptable to conventional production system.

Next, a description will be given, with reference to FIG. 8, of the case in which an instruction "WHEN DONE=35 THEN GOTO @LABEL" for jumping to the step @LABEL if the value resulting from the processings in the previous cluster is 35 is converted to a rule.

Figure 8:
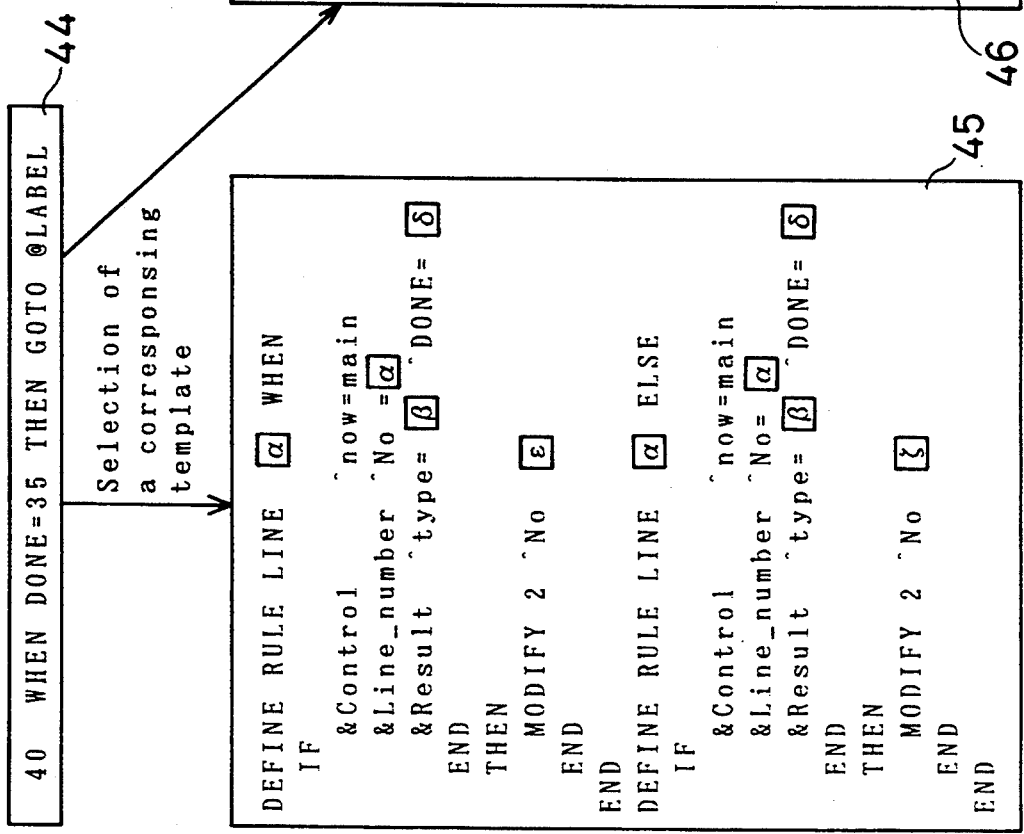

In FIG. 8 reference numeral 44 indicates a step of the control expression part, headed by its logical line number "40", for example, 45 a template prepared for that step, and 46 a rule of the conventional format into which the step is converted.

The template 45 differs from the afore-mentioned one 42 in three points. First, the condition part includes a description "& result ^ type=β ^ DONE=δ"; second, the action part includes only a description "MODIFY 2 ^ NOζ" in place of the description "MODIFY 1 ^ now β"; third, one step of the control expression part is converted to two rules.

Firstly, this indicates that information which is passed by "DONE (parameter)" from rules of each cluster to the control expression part is stored in a working memory element of a class name "Result" and two attribute names " ^ type" and " ^ DONE". Incidentially, " ^ type" represents the type of the above-mentioned information and " ^ DONE" its value.

As regards the second difference, the value of the attribute " ^ now" does not change because the step being executed does not involve a cluster control for invoking another cluster, and only the value of the attribute representing the logical line number undergoes a change because the process could jump from this step to another in the control expression part.

As regards the third difference, the reason for conversion of this step to two rules is to describe actions in both cases where a condition "the value resulting from the processings in the preceding cluster is 35" is met and where the condition is not met.

Accordingly, the line number of the step being executed, the type of the value for use in the conditional processing, the value 35, the logical line number of the step to which the process jumps by the "GOTO", and the logical line number of the next step in the control expression part are inlaid in the fields "α", "β", "δ", "ε" and "ζ" of the template, respectively.

In those cases where the process skips over to the step to be executed next by "GOTO" as in this example, or it returns to a step by GOSUB a label such as @L1 is used, but the step using the label cannot be converted into a rule, because the logical line number of a label line cannot be determined from the description of the said step only. To cope with this, when a label line is encountered in the process of assigning logical line numbers, the correspondence between the label and the logical line number is stored in a memory so that they can be matched with each other for converting the label line to a rule.

In this example the label line @L1 is assumed to have a logical line number 600.

Figure 9:
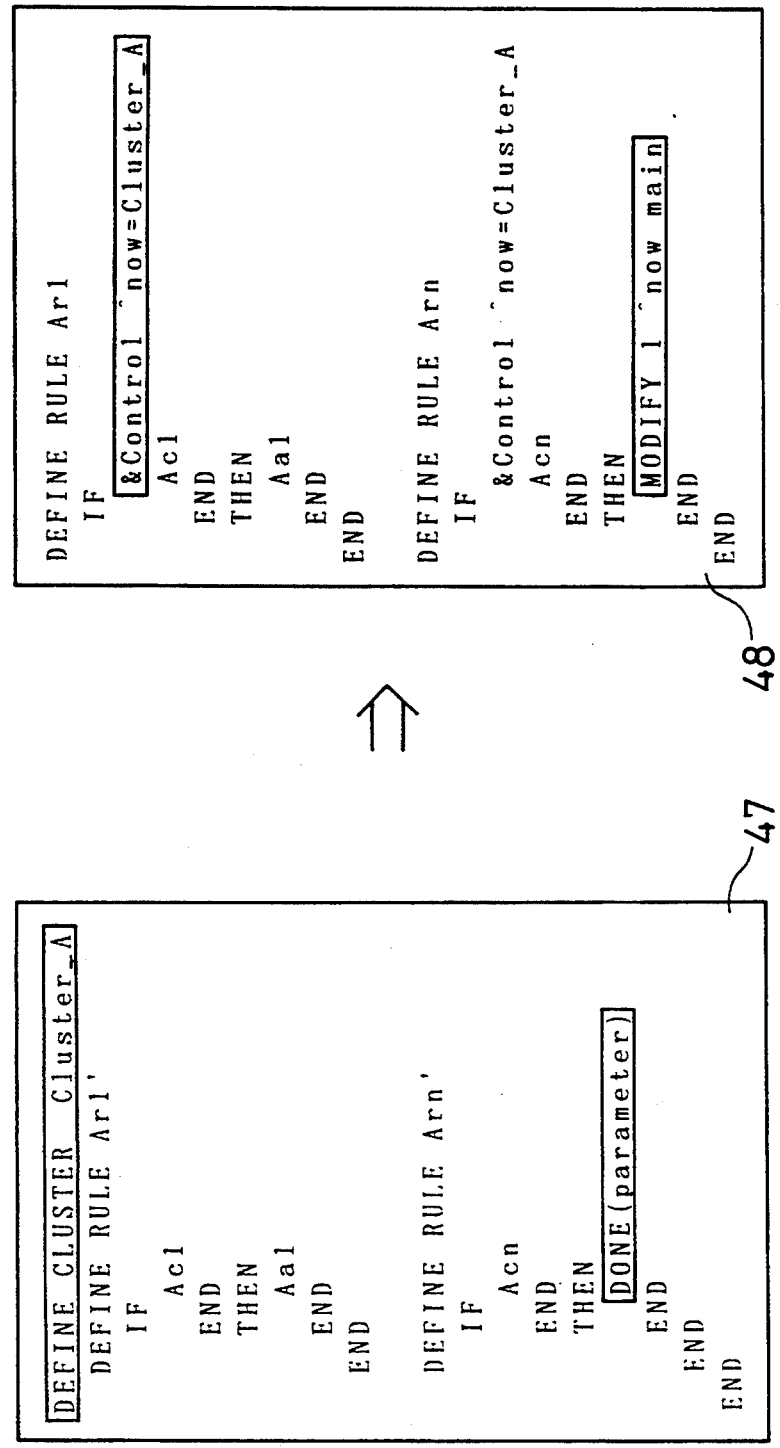
FIG. 9 shows an example of converting a rule to a conventional rule.

Next, a description will be given of the conversion of the rule part. FIG. 9 shows how rules in the cluster group separated from the control expression part according to the present invention are each converted to rules of conventional format.

In FIG. 9 reference numeral 47 indicates rules of a cluster A described according to the present invention. Said rules differ from those in the prior art in that the condition part does not include the condition element for cluster control "& Control ^ now=Cluster__A" and in that the action part of the rule to be fired at the end of execution includes, in place of the name of the cluster to be invoked next, an instruction "DONE (parameter)" indicating that the process be returned to the control expression part. Such rules can be converted to a rule of the conventional format simply by inserting the condition "& Control ^ now=Cluster__A" to the condition part of every rule in the cluster A and converting the action "DONE (parameter)" described in the action part of the rule to be fired at the end of execution to an action "MODIFY 1 ^ now MAIN" in addition to an action in which the type and the runtime value of the "parameter" are written into the attributes " ^ type" and "DONE" of the control working memory element of the class Result. This can easily be implemented through utilization of known text manipulation techniques. In this way, the rules 47 are converted to those 48 of the conventional format.

Figure 5:
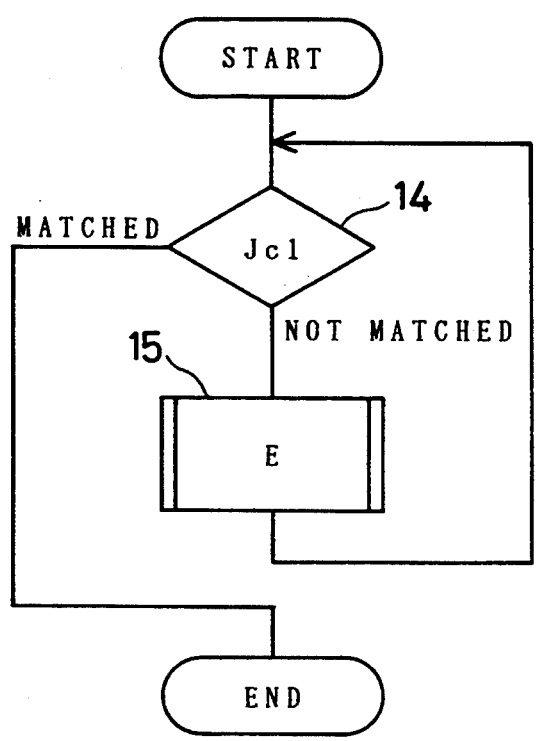
FIGS. 5(a) and 5(b) show an example of the execution of clusters which include a loop.

With the method described above, a program consisting of the control expression part and rules according to the present invention can be converted to a rule base which can be enabled by the prior art production system as an integration of the control expression part and the rules. More specifically, the program for sequencing, shown in FIG. 3, the program for branching, shown in FIG. 4, and the program for looping, shown in FIG. 5, are converted to rule bases depicted in FIGS. 10, 11 and 12, respectively. It is self-evident that they are exactly identical in function with conventional rule base programs though somewhat different in form therefrom.

Figure 15:
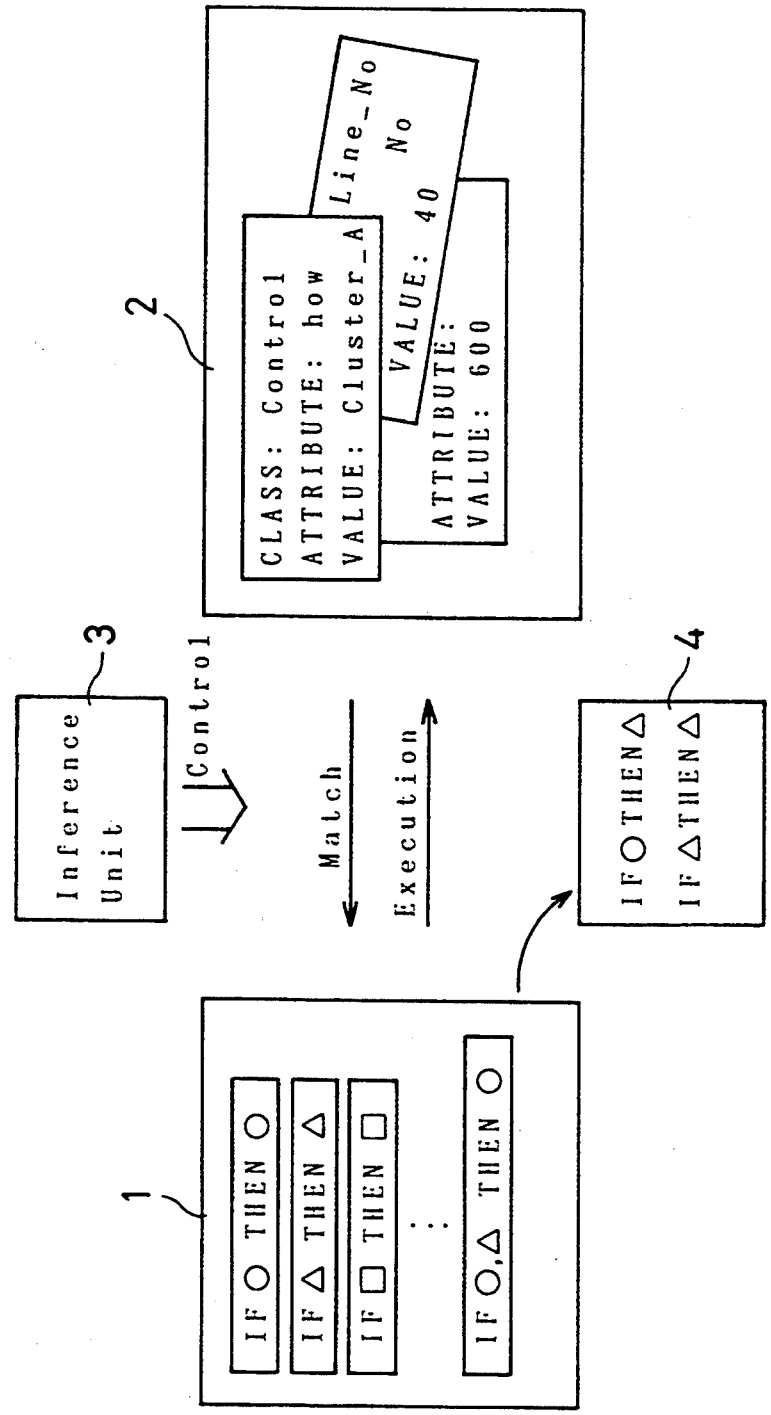
FIG. 15 illustrates an example of the construction of the production system according to the present invention.
Figure 16:
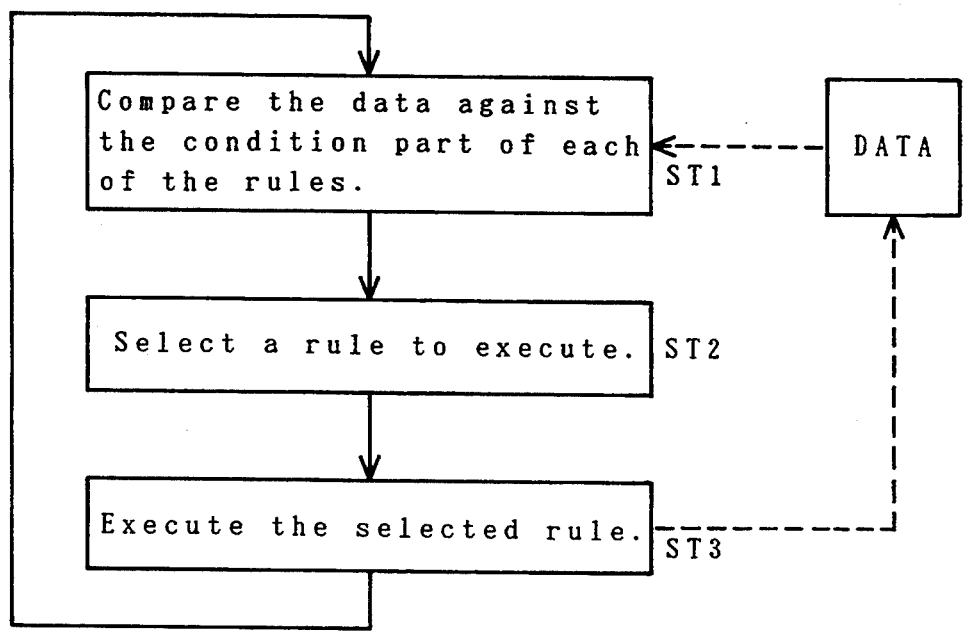
FIG. 16 is a flowchart showing the operation of the production system.
Figure 17:
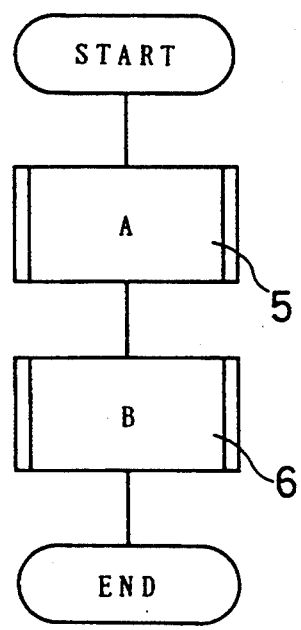
Figure 17:
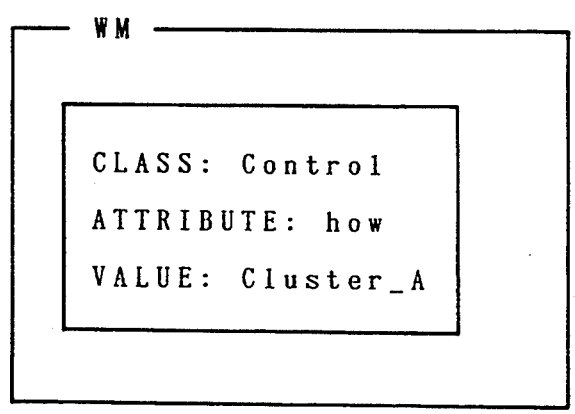
Figure 18A:
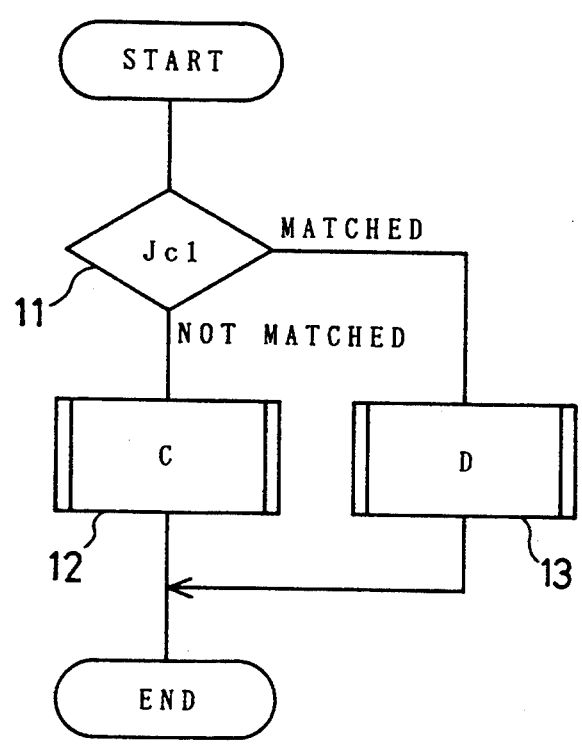
Figure 19:
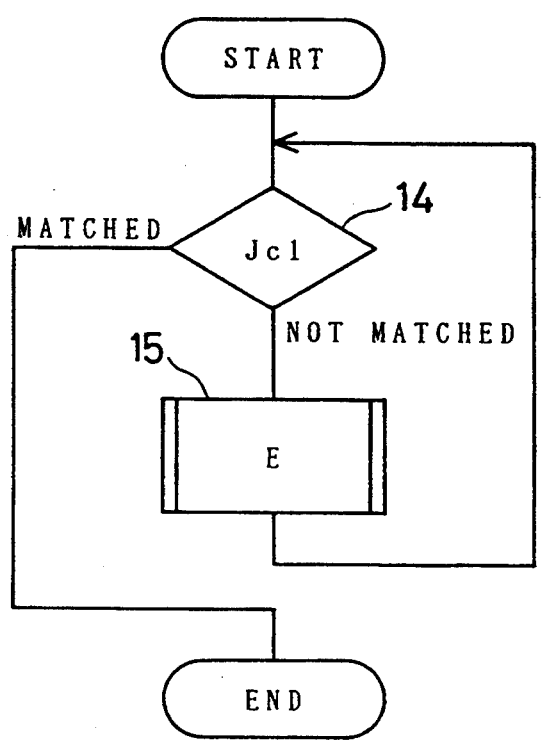

The rules converted as described above are loaded on a production memory 1 of a conventional production system shown in FIG. 15 to work as a production system.

According to the principle of the present invention described hereabove, clusters each consisting of rules of the above mentioned configuration can easily be enabled in a desired order by use of control expressions described in the same manner as in the case of a procedural language.

As will be appreciated from the above, according to the present invention, it is necessary only to write the control expression part and the rules separately of each other. Hence, in each cluster the cluster control conditions need not be taken into account during programming. This allows ease in constructing a large scale production system which has been difficult to implement because of the complexity in the description of cluster control as in those cases where many branches are included or the loop included is nested in a multiplicity.

Incidentally, control expression elements other than those mentioned above can similarly be converted to rules of the conventional format. Now, a description will be given specifically of the conversion of statements GOSUB/RETURN and REPEAT/UNTIL.

The "GOSUB" is an instruction for calling a subroutine and the "RETURN" an instruction for a return to the line next to the line from which the subroutine was called. What is essentially required for calling a subroutine in a subroutine, i.e. for nesting subroutine calls, is to monitor on a stack in the memory the number of subroutine calls made counting from the first call in the main routine and the location of the line of the calling subroutine to which control is to be returned. To this end, two classes of working memory elements are used which serve as a stack pointer and as a stack, respectively.

The working memory element for use as the stack pointer is to indicate the number of subroutine calls made in succession counting from the first call in the main routine and only one working memory element of the said class is used all the time. Its class name and attribute name are, for example, " Depth" and " sp", respectively. The stack is formed by working memory elements for storing the logical line number of the calling routine to which control is to be returned by the statement "RETURN", and they have a class name "Call_stack" and attribute names " ˆ Ret" and " ˆ depth". These working memory elements are generated one by one for each subroutine call and are deleted one by one for each return to the calling routine by "RETURN".

FIG. 13(a) shows a template for converting "GOSUB" to a rule. In FIG. 13(a) "& depth ˆ sp IS$\beta$" is a step in which the number of subroutine calls made in succession starting in the main routine, i.e. the depth of the stack, is copied to a variable $\beta$ irrespective of its value, and "LET $\beta=\beta+1$" is an instruction for incrementing the value of $\beta$ by one. "MAKE" is an instruction for generating a frame of the above-mentioned stack, i.e. a working memory element having a class name "Call stack" and attribute names " ˆ Ret" and " ˆ depth". Here, "$\gamma$" is a logical line number indicating the line in the calling routine to which control is to be returned, and "$\beta$" is a copy of the current value of the stack pointer " ˆ sp". "MODIFY 2 ˆ No$\delta$" is an action for jumping to the label of a subroutine corresponding to the logical line number "$\delta$". "MODIFY 3 ˆ sp$\beta$" means that the value of the stack pointer " ˆ sp" indicating the depth of the stack is incremented by one for each subroutine call.

FIG. 13(b) shows a template for converting "RETURN" to a rule. "LET $\beta=\beta-1$" is an instruction for decrementing the value of "$\beta$" by one. "MODIFY 2 ˆ NO $\gamma$" is an action for jumping to the line number "$\gamma$" of the original routine to which control is to be returned.

"MODIFY 3 ˆ sp $\beta$" means that the stored value of the depth of the subroutine call is decremented by one for each return from the called subroutine to the calling routine. "REMOVE" is an instruction for removing the working memory element forming the stack frame. Once control has returned to the calling routine, the information described in the attribute " ˆ Ret" on the call stack about the line in the calling routine to which control is to be returned is unnecessary and hence is removed.

The nesting of "GOSUB/RETURN" can be achieved by using working memory elements indicating the depth of the current subroutine call and the logical line number of the line in the calling routine to which control is to be returned and by changing the values of the working memory elements, generating other working memory elements and removing them as referred to above.

Likewise, nested "REPEAT/UNTIL" can also be converted to rules by using working memory elements indicating the depth or level of the current looping and the line in the parent loop to which control is to be returned and by changing the values of the working memory elements, generating or removing such working memory elements.

The embodiments described above are intended as being merely illustrative of the present invention and should not be construed as limiting the invention specifically thereto.

While in the above, the control expression part is described using a procedural language, it may also be a table describing the execution sequence.

In the above the description "DONE (parameter)" for returning from a cluster to the control expression part was assumed to be used in the rule which is fired at the end of the execution in a cluster, it may also be used in a plurality of rules. That is, where it is desired to return control to the control expression part after firing of either one of the first and second rules depending upon the state of processing in the cluster, the descriptor "DONE (parameter)" is used in the both rules. Of course, the descriptor may also be used in three or more rules as required, and after firing of any one of the rules with the description "DONE (parameter)" the processings in the cluster is completed and then control returns to the control expression part.

Where the descriptor "DONE (parameter)" is not used in any of rules, it is also possible to automatically insert the descriptor to any one of the rules.

Needless to say, in the case of using "DONE (parameter)" in action parts of two or more rules, a different parameter may be specified for each rule.

Moreover, the information obtained by the processing in the cluster is stored, as required, by the descriptor "DONE (parameter)" of the rule, in the data passing working memory element having the class name "Result" and two attribute nemes " ^ type" and " ^ DONE" as described previously. In this instance, it is necessary at the time of converting the rule to the conventional format, to insert a line for updating the attributes " ^ type", and " ^ DONE" of the data passing working memory element at run time as well as a line for updating the attribute " ^ now" to " ^ main" at run time for returning control to the control expression part.

Figure 14:
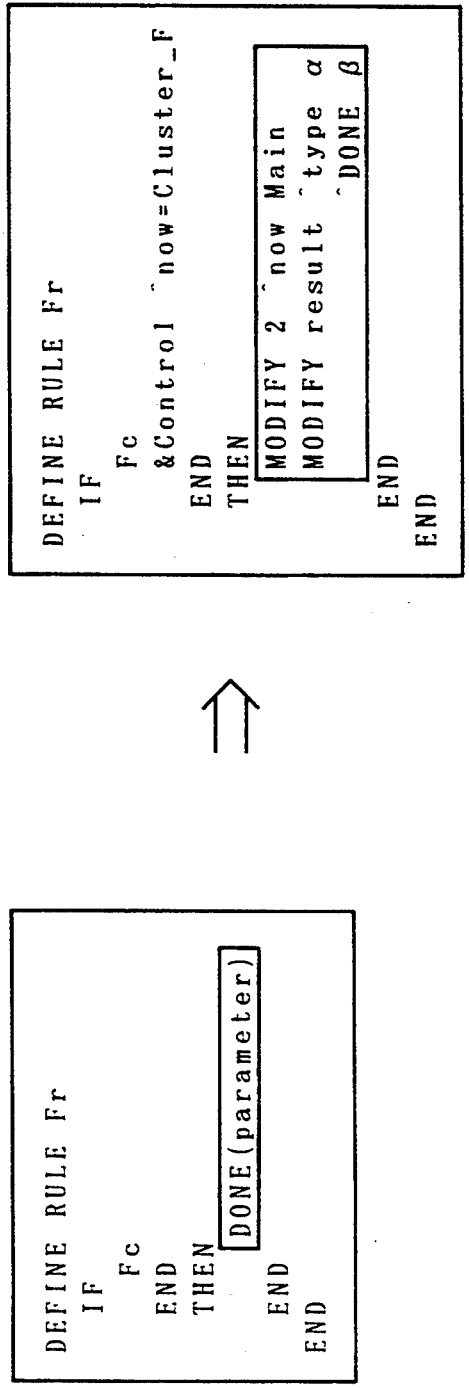

More specifically, the template in this case is one such as shown in FIG. 14 in which an action "MODIFY Result type $\alpha$ DONE $\beta$" is inserted, $\alpha$ and $\beta$ being the type and the value of the information passed, respectively.

On the contrary, it is also possible to design the entire system in such a way that a parameter obtained in the control expression part can be passed to the cluster being executed.

Furthermore, although in the above the present invention is described in a way employing after conversion of a program to the conventional format two control working memory elements, one with the class name "Control" and the attribute name " ^ now" and the other with the class name "Line_number" and the attribute name " ^ NO", one of the control working memory elements can be dispensed with by using, like the aforementioned data transfer working memory element, a working memory element with the class name "Control" and the two attribute names " ^ now" and " ^ NO".

For procedural control of the execution sequence of rules a method disclosed in Japanese Patent Kokai No. 502359/86 (or U.S. Pat. No. 4,658,370 as well as the method described above can be employed. above-mentioned Japanese application is to alter through use of a language interpreter based on a control knowledge the control procedure, i.e. the criterion upon which to select rules from a conflict set. Hence, these two methods are common in separating a program into a control part and a rule part, but the method of the present invention does not call for the language interpreter nor does it change the criterion for selecting rules from the conflict set. Accordingly, the two methods differ entirely in constitution from each other.

As will be appreciated from the above, the present invention permits easy flow control as in the case of using a procedural language and facilitates the construction of a large scale production system.

It will be apparent that many modifications and variations may be effected without departing from the scope of the novel concepts of the present invention.

What is claimed is:

1. An improved production system for optimally controlling procedural flow in a computer system, the production system comprising at least one processor, memory, and at least one processing cluster means comprising a plurality of production rules, each production rule comprising a condition part and an action part, the improvement comprising:
    (a) a unique cluster name for each processing cluster means;
    (b) means for controlling the at least one processing cluster means separate from the each of the at least one processing cluster means, the means for controlling comprising a plurality of control element means arranged in their order of operation, each control element means comprising an instruction specifying a processing cluster means to be invoked next for an operation or an instruction for other flow control, each control element means, when in operation, invoking a processing cluster means or controlling operational flow within the means for controlling; and
    (c) means for returning located in part within the action part of at least one production rule within each processing cluster means for returning control to the means for controlling;
    whereby invocation of the at least one processing cluster means is performed according to the control element means within the means for controlling, said control element means utilizing said unique cluster names during the invokation process.

2. An improved production system as set forth in claim 1, wherein at least one processing cluster means is invoked by at least one of the control element means of the means for controlling using the processing cluster means's cluster name 3. An improved production system as set forth in claim 1, wherein the means for controlling comprises a plurality of instructions comprising at least one of: conditional processing, repeated processing and subroutine call processing.

4. An improved production system as set forth in claim 1, wherein at least one control element means specifies a processing cluster means to be invoked and further includes a parameter, and the specified processing cluster means may refer to the parameter.

5. An improved production system as set forth in claim 1, wherein the instruction for returning control to the means for controlling, in the action part of at least one production rule of at least one processing cluster means, further includes a parameter which is referred to in the means for controlling.

6. An improved production system as set forth in claim 1, wherein at least one of the processing cluster means lacks an instruction for returning control to the means for controlling, and when processing reaches the end of at least one of the production rules of the processing cluster means, control automatically returns to the means for controlling.

7. A production system comprising:
    a machine having a memory and at least one processor,
    a plurality of processing cluster means, each processing cluster means comprising a plurality of production rules, the production rules comprising a condition part and an action part, each processing cluster means having a unique cluster name; and
    control means separate from the plurality of processing cluster means and comprising a plurality of control element means arranged in their order of operation, each control element means comprising an instruction specifying a processing cluster means to be invoked next for operation or an instruction for other flow control;
    the action part of at least one production rule in each processing cluster means including an instruction for returning control to the control means;
    whereby invocation of the processing clusters is performed according to the instructions described in the control element means of the control means, said instructions utilizing said unique cluster names.

8. A production system as set forth in claim 7, wherein each processing cluster means includes an instruction declaring a unique cluster name for that processing cluster means, whereby said processing cluster means is invoked by the control means using the unique cluster name.

9. A production system as set forth in claim 7, wherein the control means comprises a plurality of instructions comprising at least one of: conditional processing, repeated processing, and subroutine call processing.

10. A production system as set forth in claim 7, wherein at least one control element means specifies a processing cluster means to be invoked and further includes a parameter, and the specified processing cluster means may refer to the parameter.

11. A production system as set forth in claim 7, wherein the instruction for returning control to the control means, in the action part of at least one production rule of at least one processing cluster means, further includes a parameter which is referred to in the control means.

12. A production system as set forth in claim 7, wherein at least one of the processing cluster means lacks an instruction for returning control to the control means, and when processing reaches the end of the production rules of the processing cluster means, control automatically rreturns to the control means.

* * * * *